(12) United States Patent
Sampath et al.

(10) Patent No.: US 11,184,254 B2
(45) Date of Patent: Nov. 23, 2021

(54) NETWORK ROUTE STABILITY CHARACTERIZATION

(71) Applicant: HEWLETT PACKARD ENTERPRISE DEVELOPMENT LP, Houston, TX (US)

(72) Inventors: Rangaprasad Sampath, Bangalore (IN); Madhusoodhana Chari Sesha, Bangalore (IN); Parikshit Misra, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 188 days.

(21) Appl. No.: 16/358,084

(22) Filed: Mar. 19, 2019

(65) Prior Publication Data
US 2020/0304386 A1 Sep. 24, 2020

(51) Int. Cl.
H04L 12/26 (2006.01)
G06N 5/00 (2006.01)
G06N 20/00 (2019.01)

(52) U.S. Cl.
CPC .......... H04L 43/02 (2013.01); G06N 5/003 (2013.01); G06N 20/00 (2019.01); H04L 43/04 (2013.01)

(58) Field of Classification Search
None
See application file for complete search history.

(56) References Cited

U.S. PATENT DOCUMENTS

| | | | | |
|---|---|---|---|---|
| 8,418,249 B1* | 4/2013 | Nucci | ............... | H04L 63/1416 726/23 |
| 10,498,622 B2* | 12/2019 | Wang | ............... | H04L 12/4633 |
| 2013/0013816 A1* | 1/2013 | Radke | ............... | G06F 13/4282 710/5 |
| 2013/0100849 A1* | 4/2013 | Szabo | ............... | G06K 9/6292 370/253 |
| 2014/0362737 A1* | 12/2014 | Beshai | ............... | H04L 45/42 370/255 |

(Continued)

OTHER PUBLICATIONS

Ethan Banks, "Networking Basics: OSPF Protocol Explained", available online at <https://www.auvik.com/franklymsp/blog/ospf-protocol-explained/?>, Nov. 4, 2014, 12 pages.

(Continued)

*Primary Examiner* — Ayaz R Sheikh
*Assistant Examiner* — Faiyazkhan Ghafoerkhan
(74) *Attorney, Agent, or Firm* — McDermott Will & Emery

(57) ABSTRACT

A device may determine sample points associated with network routes within a network during a time interval, wherein each sample point that is associated with a respective network route comprises an amount of uptime for the respective network route during the time interval and a total frequency of state changes for the respective network route during the time interval. The device may generate, using an unsupervised machine learning mechanism, clusters of the sample points and may label the network routes with route stability labels based at least in part on the clusters. The device may generate, using a supervised machine learning mechanism, a route stability classifier based at least in part on the route stability labels for the network routes, and may determine, using the route stability classifier, a route stability of a new network route within the network.

18 Claims, 7 Drawing Sheets

(56) References Cited

U.S. PATENT DOCUMENTS

| | | | | |
|---|---|---|---|---|
| 2018/0373650 A1* | 12/2018 | Radke | ................ | G06F 13/4282 |
| 2019/0081877 A1* | 3/2019 | Wang | ................ | H04L 12/4633 |
| 2019/0138938 A1* | 5/2019 | Vasseur | ................ | H04L 41/147 |
| 2020/0145287 A1* | 5/2020 | Savalle | ............... | H04L 41/0813 |
| 2020/0272947 A1* | 8/2020 | Carullo | ................ | G06N 20/20 |
| 2020/0287815 A1* | 9/2020 | Kiss | .................... | H04L 43/0882 |

OTHER PUBLICATIONS

James Macfarlane, "Network Routing Basics", 2006, Network Routing Basics: Understanding IP Routing in Cisco (registered) Systems, 437 pages.

Wikipedia, "Decision tree", Feb. 15, 2019, available online at <https://en.wikipedia.org/w/index.php?title=Decision_tree&oldid=883446128>, 6 pages.

Wikipedia, "Deep packet inspection", Mar. 15, 2019, available online at <https://en.wikipedia.org/w/index.php?title-Deep_packet_inspection&oldid=887844161>, 13 pages.

Wikipedia, "k-means clustering", Mar. 13, 2019, available online at <https://en.wikipedia.org/w/index.php?title=K-means clustering&oldid=887640221>, 14 pages.

Höchst, J. et al., Unsupervised Traffic Flow Classification Using a Neural Autoencoder (Research Paper), Oct. 2017, 5 Pgs.

Vladutu, A. et al., Internet Traffic Classification Based on Flows Statistical Properties with Machine Learning, (Research Paper), International Journal of Network Management, 2015, 14 Pgs.

Vu, L. et al., A Deep Learning Based Method for Handling Imbalanced Problem in Network Traffic Classification, (Research Paper), SoICT, Dec. 7-8, 2017, 7 Pgs.

* cited by examiner

| | ROUTE 302 | NEXT HOP 304 | NEXT HOP TYPE 306 |
|---|---|---|---|
| 308A | R1 | N1 | VLAN 1 |
| 308B | R2 | N1 | VLAN 1 |
| 308C | R3 | N3 | Tunnel 1 |
| 308D | R4 | N4 | VLAN 2 |

FIG. 3

| | ROUTE 402 | ROUTE UPTIME 404 | ROUTE DOWNTIME 406 | ROUTE TOGGLE COUNT 408 |
|---|---|---|---|---|
| 410A | R1 | 15 | 45 | 20 |
| 410B | R2 | 35 | 20 | 10 |
| 410C | R3 | 45 | 15 | 5 |
| 410D | R4 | 20 | 40 | 17 |
| 410E | R5 | 20 | 40 | 16 |
| 410F | R6 | 55 | 5 | 2 |

FIG. 4

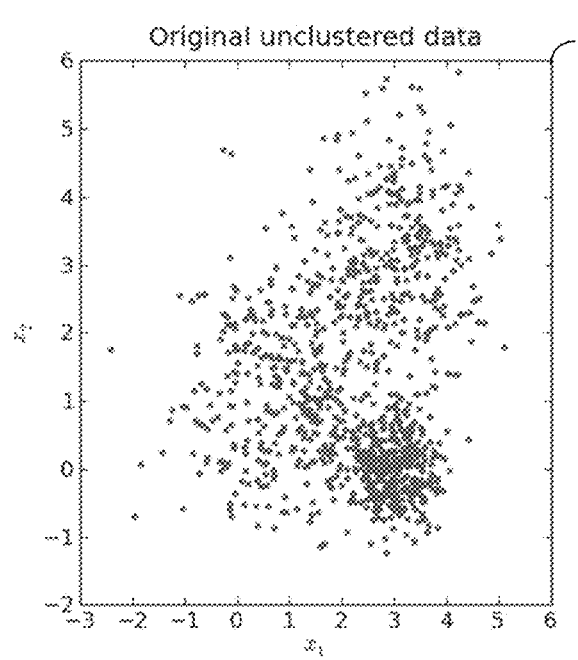
FIG. 5A
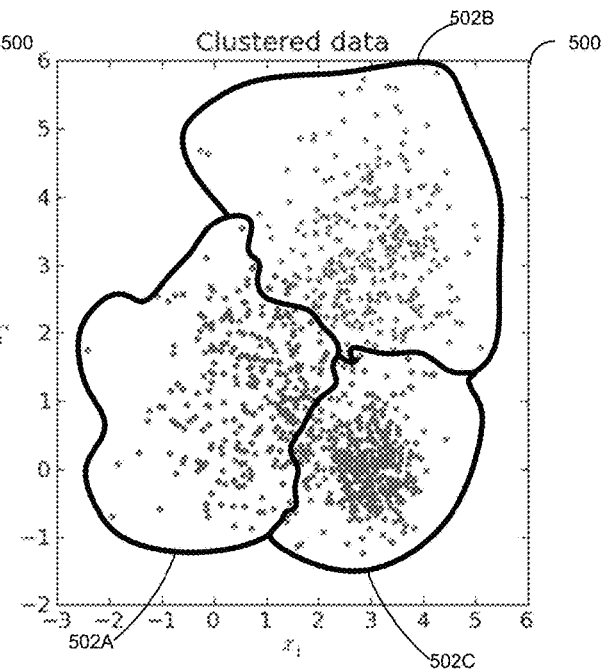
FIG. 5B
| ROUTE 502 | ROUTE UPTIME 504 | ROUTE DOWNTIME 506 | ROUTE TOGGLE COUNT 508 | ROUTE STABILITY LABEL 510 |
|---|---|---|---|---|
| R1 | 15 | 45 | 20 | FICKLE |
| R2 | 35 | 20 | 10 | INTERMITTENT |
| R3 | 45 | 15 | 5 | RELIABLE |
| R4 | 20 | 40 | 17 | FICKLE |
| R5 | 20 | 40 | 16 | FICKLE |
| R6 | 55 | 5 | 2 | RELIABLE |
FIG. 6

US 11,184,254 B2

NETWORK ROUTE STABILITY CHARACTERIZATION

BACKGROUND

A network, also referred to as a computer network or a data network, is a digital telecommunications network which allows nodes (e.g., computing devices, network devices, etc.) to share resources. In networks, nodes exchange data with each other using connections (e.g., data links) between nodes. These connections can be established over cable media such as wires or optic cables, or wireless media such as Wi-Fi.

The description provided in the background section should not be assumed to be prior art merely because it is mentioned in or associated with the background section. The background section may include information that describes one or more aspects of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 3 illustrates an example table that represents a portion of the contents of an example routing table.

FIG. 4 illustrates an example table that represents a plurality of network routes and information associated with the plurality of network routes.

FIG. 5A illustrates an example visual representation of example sample points associated with example network routes during a time interval that are plotted in an example graph.

FIG. 5B illustrates example clusters of example sample points plotted in the example graph of FIG. 5A.

FIG. 6 illustrates an example table that represents a portion of the network routes that are labeled via the clustering illustrated in FIG. 5B.

Figure 1:
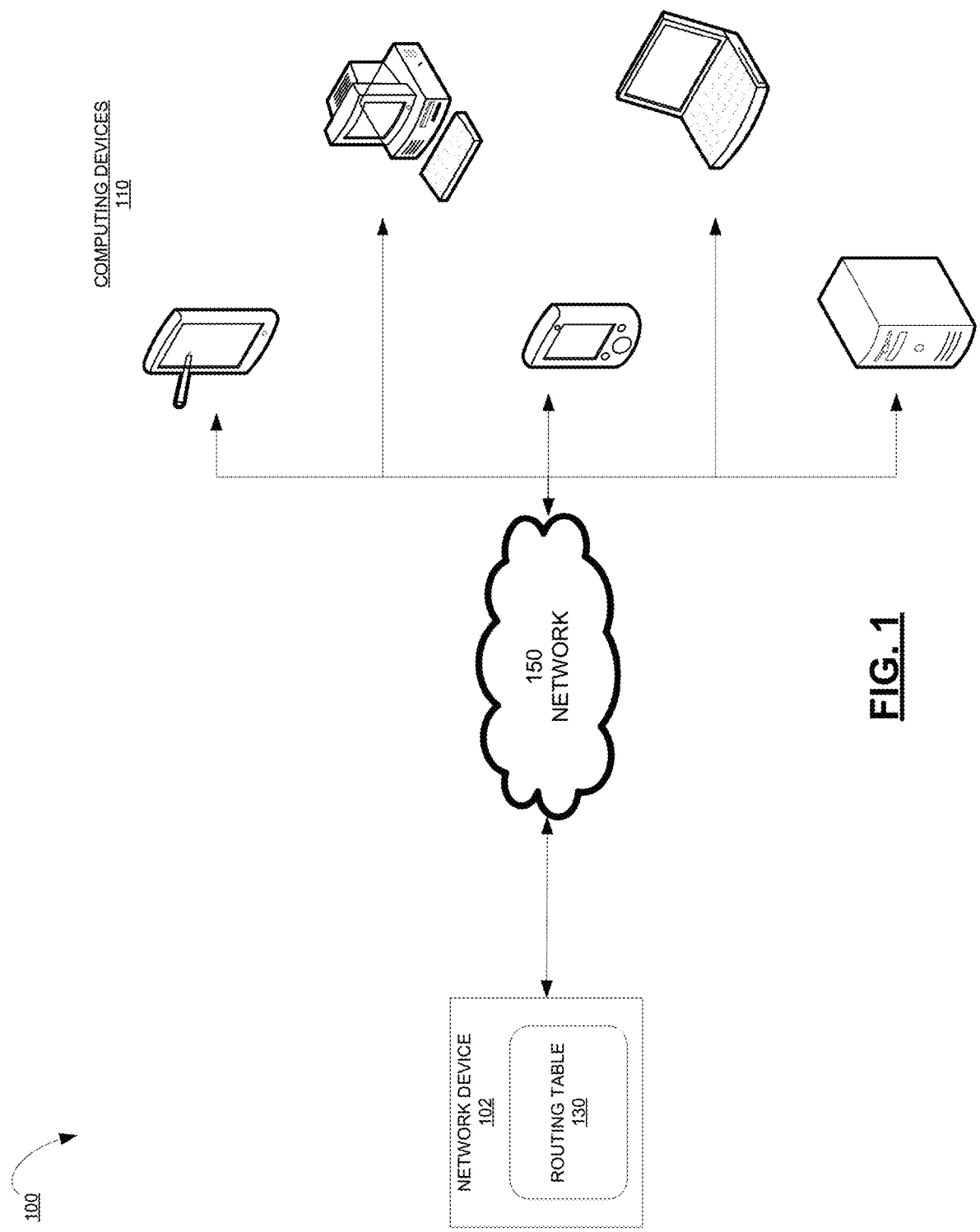
FIG. 1 illustrates an example architecture for determining network route stability.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The disclosed system provides for tracking network routes of a network to determine the route stability of the network routes within the network. The disclosed system may track network routes over a time interval to determine the route stability of the network routes based on the statistical properties and/or attributes associated with the network routes. The disclosed system may generate a route stability classifier based on the tracked network routes via use of unsupervised machine learning and supervised machine learning to determine the route stability of additional network routes within the network.

Networks may be deployed in a variety of different enterprise environments across diverse enterprise customer segments, such as in the hospitality industry, in medical care facilities, universities, and the like. Further, the networks may connect to a variety of different computing devices that send and receive data. The data sent and received in a network may be routed by network routers or other network devices to their intended network destinations, also known as endpoints.

Routing of network traffic in an efficient and effective manner improves the functioning of the network by minimizing the effects of latency, jitter, connection loss, and the like. As the types of users, applications, and network devices in a network may vary, it may be potentially challenging for a network device to recognize patterns associated with network routes within the network. However, recognizing patterns associated with network routes within a network, such as the route stability of network routes within a network, may enable network devices and administrators of a network to gain insight into network usage, network stability, and network availability to improve the routing of network traffic and thereby improve the functioning of the network.

The disclosed system may be used to determine the route stability of network routes across network deployments that may vary significantly. For example, a network at an airport may experience a wide churn in users that connect to the network for relatively short durations as the users wait for their flights, while a network at a university may experience groups of users connected to the network that change at fixed times between various buildings as classes are held at various locations on the university's campus. However, condition-based programmatic techniques may not be able to reliably determine the route stability of network routes across such widely varying network deployments.

The disclosed system provides potential technical advantages over such condition-based programmatic techniques for determining the route stability of network routes within a network. For example, because the disclosed system utilizes both an unsupervised machine learning mechanism to classify the route stability of the tracked network routes, and also use the route stability classifications of the tracked network routes as training data for a supervised machine learning mechanism to generate a route stability classifiers, the disclosed system may be able to readily adapt itself to different network deployments across a diverse variety of network deployments.

Aspects of the disclosed system are necessarily rooted in computer technology to overcome a technical problem specifically arising in the realm of computer networks, namely the problem of determining the route stability of network routes within a network. Aspects of the disclosed system solves this technical problem by tracking the state of network routes within the network over a time interval and generating a route stability classifier via use of both unsupervised machine learning and machine learning from the tracked network routes. The disclosed system may use the determined route stability classifier to classify the route stability of network routes in a network, thereby enabling network devices and administrators of a network to gain insight into network usage, network stability, and network availability to improve the routing of network traffic and thereby improve the functioning of the network.

Aspects of the disclosed system also integrate an unsupervised machine learning mechanism and a supervised machine learning mechanism into a practical application. For example, the disclosed system may use the clusters of sample points generated using the unsupervised machine learning mechanism as labeled training data for the supervised machine learning mechanism to generate a route stability classifier that the disclosed system may use to classify the route stability of network routes, which is one of the practical applications of using the unsupervised machine learning mechanism in combination with the supervised machine learning mechanism as described herein.

According to certain aspects of the present disclosure, a computer-implemented method for determining network route stability is provided. The method includes determining a plurality of sample points associated with a plurality of network routes within a network during a time interval, wherein each sample point from the plurality of sample points is associated with a respective network route from the plurality of network routes, and wherein each sample point comprises an amount of uptime for the respective network route during the time interval and a total frequency of state changes for the respective network route during the time interval. The method further includes generating, using an unsupervised machine learning mechanism, a plurality of clusters of the plurality of sample points. The method further includes labeling the plurality of network routes with route stability labels based at least in part on the plurality of clusters. The method further includes generating, using a supervised machine learning mechanism, a route stability classifier based at least in part on the route stability labels for the plurality of network routes. The method further includes determining, using the route stability classifier, a route stability of a new network route within the network.

According to certain aspects of the present disclosure, a system for determining network route stability is provided. The system includes a memory comprising a routing table. The system further includes a processor configured to execute instructions which, when executed, cause the processor to: determine a plurality of sample points associated with a plurality of network routes within a network during a time interval, wherein each sample point from the plurality of sample points is associated with a respective network route from the plurality of network routes, and wherein each sample point comprises an amount of uptime for the respective network route during the time interval and a total frequency of state changes for the respective network route during the time interval; generate, using an unsupervised machine learning mechanism, a plurality of clusters of the plurality of sample points; label the plurality of network routes with route stability labels based at least in part on the plurality of clusters; generate, using a supervised machine learning mechanism, a route stability classifier based at least in part on the route stability labels for the plurality of network routes; and determine, using the route stability classifier, a route stability of a new network route within the network.

According to certain aspects of the present disclosure, a non-transitory machine-readable storage medium comprising machine-readable instructions for causing a processor to execute a method for determining network route stability is provided. The method includes determining a plurality of sample points associated with a plurality of network routes within a network during a time interval, wherein each sample point from the plurality of sample points is associated with a respective network route from the plurality of network routes, and wherein each sample point comprises an amount of uptime for the respective network route during the time interval and a total frequency of state changes for the respective network route during the time interval. The method further includes generating, using an unsupervised machine learning mechanism, a plurality of clusters of the plurality of sample points. The method further includes labeling the plurality of network routes with route stability labels based at least in part on the plurality of clusters. The method further includes generating, using a supervised machine learning mechanism, a route stability classifier based at least in part on the route stability labels for the plurality of network routes. The method further includes determining, using the route stability classifier, a route stability of a new network route within the network.

According to certain aspects of the present disclosure, an apparatus is provided. The apparatus includes means for determining a plurality of sample points associated with a plurality of network routes within a network during a time interval, wherein each sample point from the plurality of sample points is associated with a respective network route from the plurality of network routes, and wherein each sample point comprises an amount of uptime for the respective network route during the time interval and a total frequency of state changes for the respective network route during the time interval. The apparatus further includes means for generating, using an unsupervised machine learning mechanism, a plurality of clusters of the plurality of sample points. The apparatus further includes labeling the plurality of network routes with route stability labels based at least in part on the plurality of clusters. The apparatus further includes generating, using a supervised machine learning mechanism, a route stability classifier based at least in part on the route stability labels for the plurality of network routes. The apparatus further includes means for determining, using the route stability classifier, a route stability of a new network route within the network.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

FIG. 1 illustrates an example architecture 100 for determining network route stability. As shown in FIG. 1, architecture 100 includes network device 102 and computing devices 110 connected over network 150.

Network 150 can include, for example, a local area network (LAN) or a portion of a LAN. Network device 102 may be any suitable network device, such as a router, a switch, an access point (e.g., a WiFi access point), and the like. Computing devices 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities to connect to network 150 and to send and receive data via network 150. In some examples, computing devices 110 may include one or more network devices, such as one or more routers, switches, access points, and the like.

As computing devices 110 operate as they are connected to network 150, computing devices 110 may create network traffic within network 150 by sending and receiving data within network 150. The data sent and received within network 150 may be routed by a network router, such as network device 102, to its intended network destination within network 150. Each of the data sent and received within network 150 may have a network destination that is indicated by the network address of the network destination.

When network device 102 acts as a network routing device, such as a network router a network gateway, and the like, network device 102 may encounter the data sent and received within network 150, and may route the data to their intended destinations. Because a data packet may travel through one or more intermediate network nodes within network 150 before reaching its network destination, network device 102 may route data by forwarding the data to its next intermediate network node along its path to the data's intended destination.

Network device 102 route data to their intended network destinations based at least in part on routing table 130. Routing table 130 may be a data table stored in network device 102 that lists the active network routes to network destinations within network 150. Routing table 130 may include a plurality of network entries associated with a plurality of active network routes, where each active network route is associated with a network destination within network 150.

Each entry of routing table 130 associated with an active network route may include an indication of the network destination of the associated active route, such as in the form of a network address (e.g., an Internet Protocol (IP) address prefix of the network destination). The entry may also include an indication of the next intermediate network node (also referred to as the next hop) in the active network route to the network destination, which may also be in the form of the network address of the next intermediate network node.

Routing table 130 may only include entries for active network routes within network 150, and may not include entries for inactive network routes within network 150. An active network route associated with a network destination is a network route that network device 102 may use to route data to the associated network destination, while an inactive network route associated with a network destination is a network route that cannot be used by network device 102 to route data to the associated network destination. A network route associated with a network destination may be active when the network route is able to be used by network device 102 to route data to the associated network destination.

Conversely, a network route may be inactive when the network route is not able to be used by network device 102 to route data to the associated network destination. For example, a network route may be inactive when one or more of the intermediate network nodes for the network route is not available to receive and forward data along the network route to the associated network destination.

A network route may not always be an active network route or an inactive network route. For example, if an intermediate network node of an active network route goes down and is unable to receive and forward data along the network route, the state of the network route may switch from being active to being inactive. However once the intermediate network node that is down goes back up and is able to once again receive and forward data along the network route, the network route may once again switch from being inactive to being active.

Because routing table 130 may only include an indication of a network route when the network route is active, network device 102 may determine, at a particular time, whether a network route is active or inactive based on whether routing table 130 includes an indication of the network route at that particular time. If routing table 130 includes an indication of a network route at a particular time, network device 102 may determine that the network route is active at the particular time. Conversely, if routing table 130 does not include an indication of a network route at a particular time, network device 102 may determine that the network route is inactive at the particular time. In this way, network device 102 may observe the state of network routes during a time interval to determine a route stability classifier that network device 102 may use to classify the stability of network routes.

In accordance with aspects of the present disclosure, network device 102 may determine a plurality of sample points associated with a plurality of network routes within network 150 during a time interval, where each sample point from the plurality of sample points that is associated with a respective network route from the plurality of network routes comprises an amount of uptime for the respective network route during the time interval and a total frequency of state changes for the respective network route during the time interval.

The amount of uptime for the respective network route during the time interval may be the amount of time the network route is active during the time interval, which network device 102 may determine from the total amount of time routing table 130 includes an indication of the respective network route during the time interval. The total frequency of state changes for the respective network route during the time interval may be the number of times the respective network route switches between an active state and an inactive state and vice versa during the time interval, which network device 102 may determine based on the number of times an indication of the respective network route is included and is not included in routing table 130 during the time interval.

Network device 102 may generate, using an unsupervised machine learning mechanism, such as a k-means clustering unsupervised machine learning mechanism, a plurality of clusters of the plurality of sample points. The plurality of clusters may be associated with a plurality of route stability labels, so that each cluster from the plurality of clusters is associated with a route stability label from the plurality of route stability labels.

Network device 102 may label the plurality of network routes based at least in part on the plurality of clusters. Because each network route from the plurality of network routes is associated with a sample point from the plurality of sample points, and because each sample point from the plurality of sample points may be assigned to one of the plurality of clusters, network device 102 may label each network route with the route stability label associated with the cluster to which the sample point associated with the network route is assigned.

Network device 102 may generate, using a supervised machine learning mechanism, a route stability classifier based at least in part on the labels for the plurality of network routes. Network device 102 may use the labeled plurality of network routes as a labeled set of training data for the supervised machine learning mechanism to generate the route stability classifier. For example, the labeled set of training data may include, for each of the labeled plurality of network routes, the amount of uptime for the network route during the time interval, a total frequency of state changes for the network route during the time interval, and the route stability label for the network route.

The resulting route stability classifier may be a decision tree classifier that takes as inputs, the amount of uptime for a network route during a time interval and a total frequency of state changes for the network route during the time interval and may return a route stability label for the network route. In this way, network device 102 may determine, using the route stability classifier, a route stability of a new network route within network 150.

Example Network Route Stability Classification System

Figure 2:
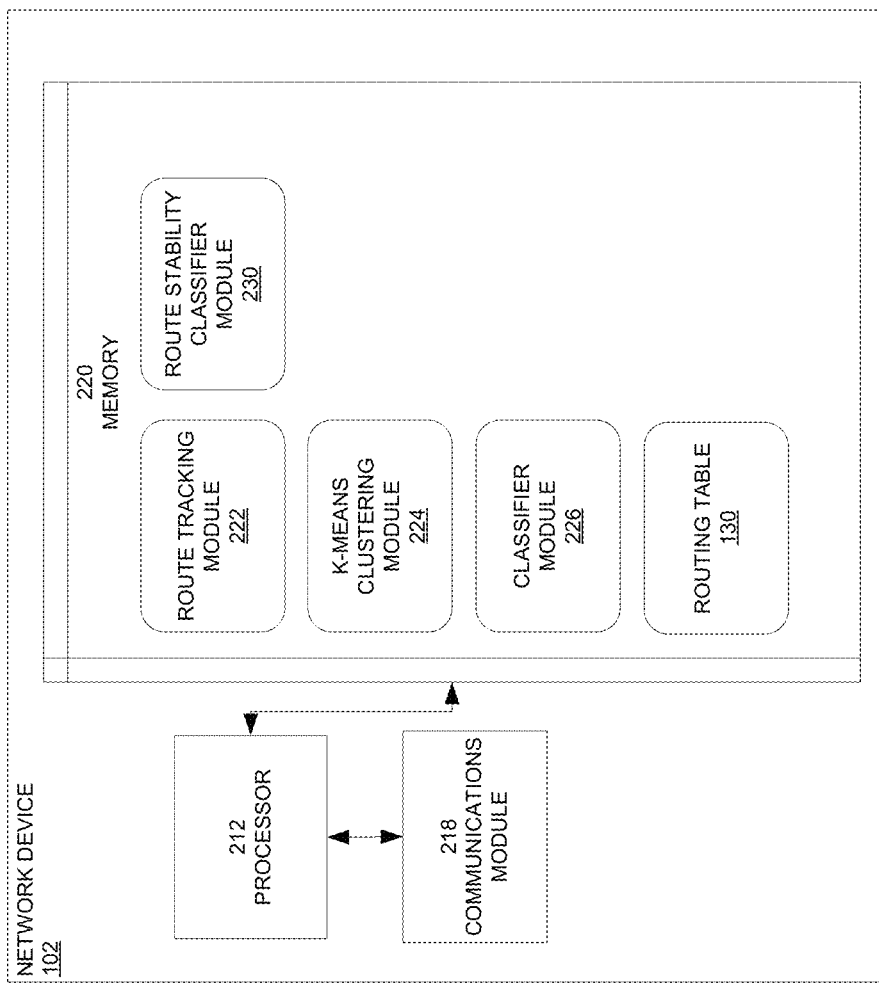
FIG. 2 is a block diagram illustrating the example network device from the architecture of FIG. 1 according to certain aspects of the disclosure.

FIG. 2 is a block diagram illustrating an example network device 102 in the architecture 100 of FIG. 1 according to certain aspects of the disclosure. As shown in FIG. 2, network device 102 includes a processor 212, a communications module 218, and a memory 220 that includes route tracking module 222, k-means clustering module 224, classifier module 226, route stability classifier module 228, and routing table 130.

Communications module 218 and send and receive data over network 150 as network device 102 operates. For example, communications module 218 may send and receive data as part of performing its functionality as a network switch, a network router, an access point, and the like. Data sent and received by communications module 218 is referred to herein as data or data packets that are encountered by network device 102.

Routing table 130 may be a data table stored in network device 102 that lists the active network routes to network destinations within network 150. Routing table 130 may include a plurality of network entries associated with a plurality of active network routes, where each active network route is associated with a network destination within network 150. Network device 102 may update the entries of routing table 130 using information from the control plane (not shown) of network device 102 that runs a routing protocol to route data encountered by network device 102, such as an interior gateway protocol such as an Open Shortest Path First (OSPF) routing protocol or an Intermediate System to Intermedia System (IS-IS) routing protocol.

Processor 212 of network device 102 is configured to execute instructions, such as instructions physically coded into the processor 212, instructions received from software in memory 220, or a combination of both. For example, the processor 212 of the network device 102 executes instructions of route tracking module 222 to determine a plurality of sample points associated with the plurality of network routes within the time interval, where each sample point from the plurality of sample points that is associated with a respective network route from the plurality of network routes comprises an amount of uptime for the respective network route during the time interval and a total frequency of state changes for the respective network route during the time interval.

Network device 102 may track a plurality of network routes within a network during a time interval. An example of the time interval may be a sixty minute time interval. The plurality of network routes within the network during the time interval may be network routes that are active during at least a portion of the time interval. For each network route that is included in routing table 130 during the time interval, network device 102 may determine a sample point for the network route that includes two values: the uptime for the network route during the time interval and the total frequency of state changes for the network route during the time interval.

The uptime for a network route during the time interval is the cumulative amount of time (e.g., in seconds or in minutes) that the network route is active during the time interval. Because routing table 130 may, at a particular time, only include indications of network routes that are active at the particular time, and may not, at the particular time, include indications of any network routes that are inactive at the particular time, network device 102 may determine the total amount of time that the network route is active during the time interval as the total amount of time during the time interval in which routing table 130 includes an indication of the network route.

Conversely, the downtime for a network route during the time interval is the cumulative amount of time (e.g., in seconds) that the network route is inactive during the time interval after it first becomes active within the time interval. Because routing table 130 may, at a particular time, only include indications of network routes that are active at the particular time, and may not, at the particular time, include indications of any network routes that are inactive at the particular time, network device 102 may determine the total amount of time that the network route is inactive during the time interval after it first becomes active within the time interval as the total amount of time during the time interval in which routing table 130 does not include an indication of the network route after routing table first includes an indication of the network route. For example, if, within a sixty minute interval, the network route is active for the first twenty minutes of the time interval, inactive for the second twenty minutes of the time interval, and active for the last twenty minutes of the time interval, the downtime for the network route during the time interval may be forty minutes.

Further, during a time interval, it is possible that a network route may switch between an active state to an inactive state and vice versa. The total frequency of state changes for the network route during the time interval is the number of times that a network route switches its state between an active state and an inactive state during the time interval after it first becomes active within the time interval. For example, if a network route that is in an active state during a time interval and subsequently switches from the active state to the inactive state and then switches back from the inactive state to the active state during the time interval, then the total frequency of state changes for the network route during the time interval is two, which includes the switch from the active state to the inactive state and the switch from the inactive state to the active state.

Because routing table 130 includes an indication of a network route when the network route is in an active state and does not include the indication of the network route when the network route switches to an inactive state, network device 102 may determine the number of times that network route switches its state between an active state and an inactive state during the time interval after it first becomes active within the time interval based on routing table 130. Thus, network device 102 may determine the total frequency of state changes for a network route during a time interval as the number of times route table 130 switches between including and not including an indication of the network route. In this way, network device 102 may determine total frequency of state changes for the network route during the time interval.

Processor 212 of network device 102 may execute instructions to generate, using an unsupervised machine learning mechanism, a plurality of clusters of the plurality of sample points. In particular, processor 212 of network device 102 may execute instructions of route tracking module 222 to derive a set of training data for the unsupervised machine learning mechanism based on at least the portion of the plurality of sample points, and may further execute instructions to generate the plurality of clusters of the plurality of sample points by inputting the set of training data into the unsupervised machine learning mechanism.

Network device 102 may utilize a portion of the sample points as the set of training data for the unsupervised machine learning mechanism and may utilize the remaining portion of the sample points as a set of testing data for the unsupervised machine learning mechanism. For example, network device 102 may utilize 80% of the sample points as the set of training data for the unsupervised machine learning mechanism and may utilize the remaining 20% of the sample points as the set of testing data for the unsupervised machine learning mechanism. Network device 102 may also perform any suitable normalization operations to normalize the sample points that are used as the set of training data for the unsupervised machine learning mechanism.

K-means clustering module 224 may be the unsupervised machine learning mechanism used by network device 102 to generate the plurality of clusters of the plurality of sample points. Processor 212 of network device 102 may execute instructions to input the plurality of sample points into k-means clustering module 224, and may execute instructions of k-means clustering module 224 to perform k-means clustering of the plurality of sample points to generate the plurality of clusters of the plurality of sample points. By generating the plurality of clusters of the plurality of sample points, network device 102 performs k-means clustering to assign each of the plurality of sample points into one of the plurality of clusters.

The plurality of clusters generated by network device 102 may each encompass a range of sample points. In particular, because each sample point may be represented as (m, n), where m is the uptime for the network route during the time interval, and n is the total frequency of state changes for the network route during the time interval, network device 102 may determine the range of different sample points (m, n) that are encompassed by each of the plurality of clusters. In addition, given a new sample point (m, n), network device 102 may determine the cluster to which the new sample point belongs out of the plurality of clusters, or may even determine whether the new sample point falls outside of the plurality of clusters.

In some examples, the plurality of clusters may be associated with route stability labels, where each cluster from the plurality of clusters may be associated with a route stability label. The route stability label may be one of: fickle, reliable, or intermittent. Network device 102 may associate a cluster that encompass a portion of the plurality of sample points associated with network routes that constantly change within network 150 with the fickle label. Network device 102 may associate a cluster that encompasses a portion of the plurality of sample points associated with network routes that rarely change in network 150 with the reliable label. Network device 102 may associate a cluster that encompasses a portion of the plurality of sample points associated with remaining network routes not determined to be fickle or reliable with the intermittent label.

Network device 102 may label each network route with the same route stability label as the cluster that encompasses the sample point associated with the network route. In particular, processor 212 of network device 102 may execute the instructions of classifier module 226 to label the plurality of network routes based at least in part on the plurality of clusters. For example, because each cluster from the plurality of clusters may be associated with a label, and network device 102 may, for each sample point assigned to one of the plurality of clusters, label the network route associated with sample point with the same label associated with the cluster that encompasses the sample point associated with the network route.

For example, if the sample point associated with a network route is assigned to a cluster labeled with the reliable label, then network device 102 may label the network route associated with the sample point with the same reliable label. In this way, network device 102 may label the plurality of network routes with route stability labels based at least in part on the plurality of clusters.

Processor 212 of network device 102 may execute the instructions of classifier module 226 to generate, using a supervised machine learning mechanism, a route stability classifier based at least in part on the route stability labels for the plurality of network routes. In particular, classifier module 226 may be configured to use the sample points associated with the plurality of network routes and the route stability labels associated with the plurality of network routes as labeled training data for the supervised machine learning mechanism to generate the route stability classifier. The labeled training data may include a set of input-output pairs, associated with the plurality of network routes, where the input-output pair associated with a network route may include the sample point (i.e., the uptime for a network route during a time interval and the total frequency of state changes for the network route during the time interval) associated with the network route as the input, and the route stability label associated with the network route as the output. In this way, network device 102 may generate a route stability classifier that may take as inputs the uptime for a network route during a time interval and the total frequency of state changes for the network route during the time interval and output a route stability label for the network route.

The route stability classifier may be a decision tree classifier that take as inputs the uptime for a network route during a time interval and the total frequency of state changes for the network route during the time interval and, in response, output an indication of the route stability of the network route, such as a route stability label for the network route. Because the characteristics of the decision tree classifier, such as the levels, bounds, and routes of the decision tree classifier are determined via machine learning as described above, network device 102 may generate different decision tree classifiers for different networks and different network environments.

Processor 212 of network device 102 may execute instructions of route stability classifier module 230 to determine, using the route stability classifier, a route stability of a new network route within the network. Processor 212 may provide the uptime for the network route during a time interval and the total frequency of state changes for the network route during the time interval as inputs to the route stability classifier and, in response, the route stability classifier may generate an output that is a route stability label for the new network route that indicates the route stability of the new network route. For example, the route stability label outputted by the route stability classifier may be one of: reliable, intermittent, or fickle, as described herein.

Network device 102 may use the route stability classifier to gain insights into the functioning of network 150. For example, network device 102 may determine changes in route stability of new network routes within network 150 over time using the route stability classifier. In subsequent time intervals after generating the route stability classifier, network 150 may process the new network routes in network 150 during the subsequent time intervals to classify the route stability of the network routes. For example, network device 102 may determine that a group of network routes has transitioned over time from being classified as intermittent to being classified as fickle. In response to making such a determination, network device 102 may determine that a software bug on a network router (e.g., network device 102) or congestion issues on a link connecting the peer routers is leading to delayed convergence of the routing protocol.

In another example, network device 102 may determine that the ratio of network routes classified as reliable to overall network routes in network 150 is on a downward trend. In response, network device 102 may determine that new paths are opening up in network 150 that may lead to temporary instability in network 150 but may ultimately lead to long term stability in network 150.

In another example, network device 102 may determine that a network route classified as reliable is inactive for more than a specified time. In response, network device may determine that a possible failure, such as a software failure or a hardware failure, has occurred in network 150 and has not yet recovered.

In another example, network device 102 may determine that the ratio of network routes classified as fickle to overall network routes in network 150 is decreasing over time. In response, network device 102 may determine that network routes within network 150 are becoming stable.

FIG. 3 illustrates an example table 300 that represents a portion of the contents of an example routing table. While table 300 includes five example entries 380A-308E, routing tables may include hundreds of thousands or even millions of records. As shown in FIG. 3, table 300 includes entries 308A-308E (hereafter "entries 308"), each of which may represent an entry in a routing table, such as routing table 130 of FIG. 2. For example, entry 308A may be an entry in a routing table for network route R1, entry 308B may be an entry in a routing table for network route R2, entry 308C may be an entry in a routing table for network route R3, and entry 308D may be an entry in a routing table for network route R4. Each of entries 308 may include an indication of the network route 302, an indication of the next hop 304, and an indication of the next hop type 306. Network route 302 may be indicated in entries 308 as the Internet Protocol (IP) address of the network destination for the associated network route, such as the IP address prefix for the network destination. Next hop 304 may be indicated in entries 308 as the IP address of the next device along the network route, which may be the immediate transit point from the viewpoint of network device 102 to reach the network destination associated with the route. Next hop type 306 may indicate the interface type of next hop 304 in entries 308, such as a virtual local area network (VLAN) interface, a tunnel interface, and the like.

FIG. 4 illustrates an example table 400 that represents a plurality of network routes and information associated with the plurality of network routes. As shown in FIG. 4, table 400 includes entries 410A-410F (hereafter "entries 410"), each of which may be associated with a network route that is active in network 150 for at least a portion of a time interval. For each of routes R1-R6, example table 400 includes an entry in entries 410 that includes indication of the route 402, an indication of the uptime of the route during the time interval 404, an indication of the downtime of the route during the time interval 406, and the total frequency of state changes for the network route during the time interval 408. Network device 102 may use the information illustrated in table 400 for the network routes to generate a plurality of clusters for the plurality of network routes, according to the techniques disclosed herein.

FIG. 5A illustrates an example visual representation of example sample points associated with example network routes during a time interval that are plotted in example graph 500. As shown in FIG. 5A, sample points that are determined by network device 102 according to the techniques disclosed herein for a plurality of network routes are plotted in graph 500. In graph 500, the x-axis, labeled herein as $x_1$, represents the uptime for the route during the time interval, and the y-axis, labeled herein as $x_2$, represents the total frequency of state changes for the network route during the time interval. In addition, the sample points illustrated in graph 500 may be normalized so that they are within the ranges of the x-axis and the y-axis.

FIG. 5B illustrates example clusters 502A-502C of example sample points plotted in example graph 500 of FIG. 5A. As shown in FIG. 5B, the sample points plotted in example graph 500 may be clustered, such as by using a k-means clustering unsupervised machine learning algorithm, to generate clusters 502A-502C. In the example of FIG. 5B, cluster 502C is labeled as reliable where the network routes associated with the sample points in cluster 502C rarely change in network 150 during the time interval. Cluster 502B is labeled as fickle where the network routes associated with the sample points in cluster 502B changes frequently in network 150 during the time interval. Cluster 502A is labeled as intermittent where the network routes associated with the sample points in cluster 502A are neither fickle nor reliable.

Network device 102 may label each of the plurality of network routes associated with the plurality of sample points based on the clusters assigned to the plurality of sample points associated with the plurality of network routes. FIG. 6 illustrates an example table 600 that represents a portion of the network routes that are labeled via the clustering illustrated in FIG. 5B.

As shown in FIG. 6, table 600 is similar to table 400 illustrated in FIG. 4 except with the addition of route stability labels associated with the network routes illustrated in table 600. Table 600 includes entries 612A-612F (hereafter "entries 612"), each of which may be associated with a network route that is active in network 150 for at least a portion of a time interval. For each of network routes R1-R6, example table 600 includes an entry in entries 612 that includes indication of the network route 602, an indication of the uptime of the network route during the time interval 604, an indication of the downtime of the network route during the time interval 606, the total frequency of state changes for the network route during the time interval 608, and an indication of the route stability label of the network route 610. In the example of FIG. 6, network route R1 may be labeled fickle, network route R2 may be labeled intermittent, network route R3 may be labeled reliable, network routes R4 and R5 may each be labeled fickle, and network route R6 may be labeled reliable.

Network device 102 may utilize the labeled network routes to generate a route stability classifier using a supervised machine learning mechanism. In particular, network device may use a set of labeled network routes as labeled training data for the supervised machine learning mechanism to generate a decision tree as the route stability classifier. Network device 102 may generate the labeled training data from the labeled network routes and may input the labeled training data into the supervised machine learning mechanism to generate the route stability classifier, as described in this disclosure.

Figure 7:
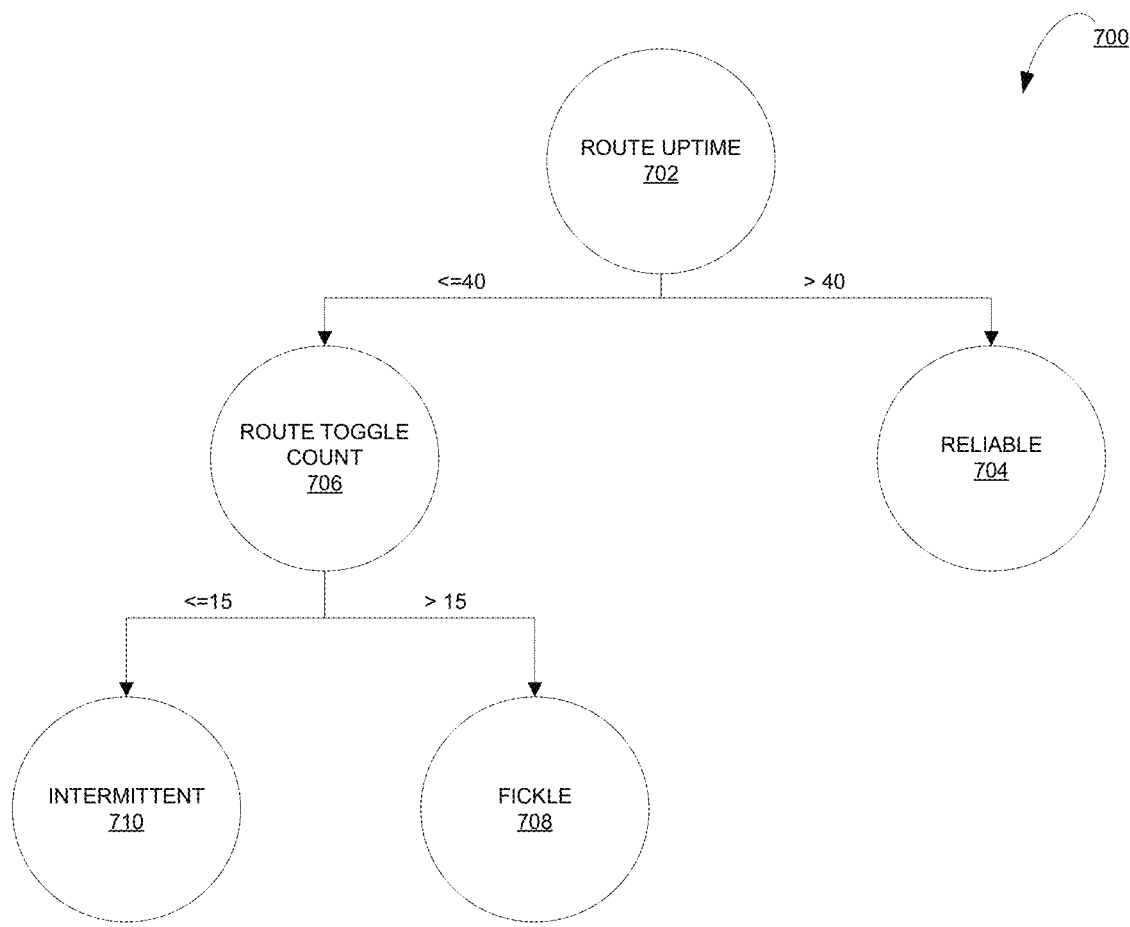
FIG. 7 illustrates an example decision tree that is used as a route stability classifier.

FIG. 7 illustrates an example decision tree 700 that is used as a route stability classifier. A decision tree is a decision support tool that uses a tree-like model of decisions and possible consequences, where each internal node represents a test on an attribute, each branch represents the outcome of the test, and each leaf node represents a class label.

As shown in FIG. 7, node 702 of decision tree 700 represents a test of the route uptime the network route during a time interval. If the route uptime is greater than 40 seconds, then decision tree 700 proceeds to leaf node 704 to label the network route as being reliable. If the route uptime is less than or equal to 40 seconds, the decision tree 700 proceeds to node 706. Node 706 of decision tree 700 represents a test of the total frequency of state changes for the network route during the time interval, which is also referred to herein as the route toggle count. If the total frequency of state changes for the network route during the time interval is greater than 15, then decision tree 700 proceeds to leaf node 708 to label the network route as being fickle. If the total frequency of state changes for the network route during the time interval is less than or equal to 15, then decision tree 700 proceeds to leaf node 710 to label the network route as being intermittent. In this way, network device 102 may use a route stability classifier, such as illustrated by decision tree 700, to determine the route stability of a network route.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 8:
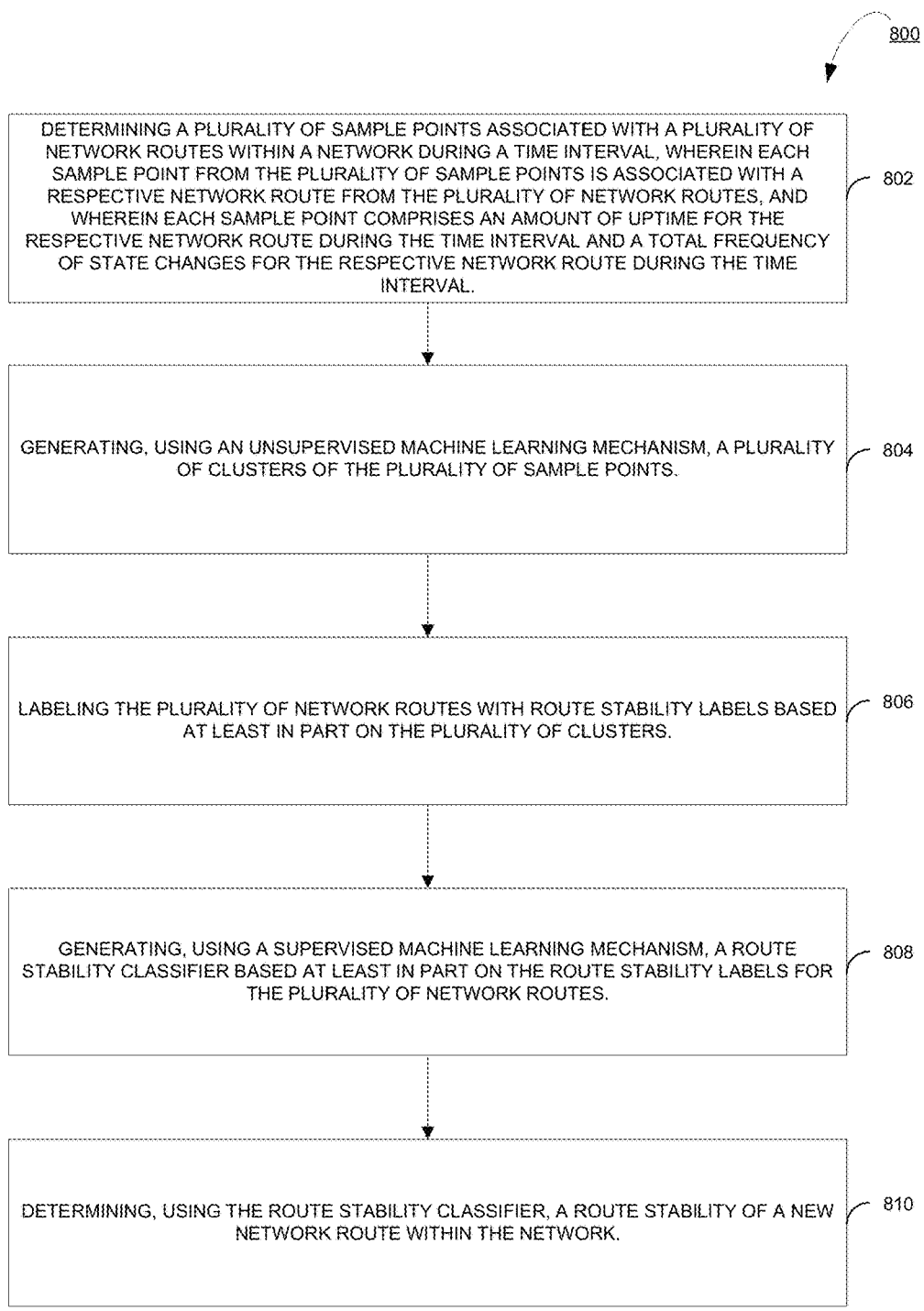
FIG. 8 illustrates an example process for determining network route stability using the example network device of FIGS. 1 and 2.

FIG. 8 illustrates an example process 800 for determining network route stability using the example network device 102 of FIGS. 1 and 2. While FIG. 8 is described with reference to FIGS. 1 and 2, it should be noted that the process steps of FIG. 8 may be performed by other systems.

The process 800 begins by proceeding to step 802 where network device 102 may determine a plurality of sample points associated with a plurality of network routes within a network 150 during a time interval, wherein each sample point from the plurality of sample points is associated with a respective network route from the plurality of network routes, and wherein each sample point comprises an amount of uptime for the respective network route during the time interval and a total frequency of state changes for the respective network route during the time interval.

In some examples, determining the plurality of sample points associated with the plurality of network routes within the network 150 may include tracking changes within a routing table 130 in the network 150 to determine the amount of uptime for the respective route during the time interval and the total frequency of state changes for the respective route during the time interval. In some examples, tracking the changes within the routing table 130 in the network 150 may include determining the amount of uptime for the respective network route during the time interval based on an amount of time during the time interval that the routing table 130 includes an indication of the respective network route, and determining the total frequency of state changes for the respective network route during the time interval based on a number of times the routing table 130 switches between including the indication of the network route and not including the indication of the network route.

The process 800 proceeds to step 804 where network device 102 may generate, using an unsupervised machine learning mechanism, a plurality of clusters of the plurality of sample points. In some examples, generating, using the unsupervised machine learning mechanism, the plurality of clusters of the plurality of sample points may include deriving a set of training data for the unsupervised machine learning mechanism based on at least the portion of the plurality of sample points, and generating the plurality of clusters 502 of the plurality of sample points by inputting the set of training data into the unsupervised machine learning mechanism.

In some examples, the unsupervised machine training mechanism may include a k-means clustering unsupervised machine learning mechanism, and generating the plurality of clusters 502 of the plurality of sample points comprises performing, using the k-means clustering unsupervised machine learning mechanism, k-means clustering of the plurality of sample points to generate the plurality of clusters 502 of the plurality of sample points.

The process 800 proceeds to step 806 where network device 102 may label the plurality of network routes with route stability labels based at least in part on the plurality of clusters 502. In some examples, labeling the plurality of network routes with route stability labels based at least in part on the plurality of clusters 502 includes labeling each network route from the plurality of network routes with a route stability label associated with a cluster from the plurality of clusters 502 to which a sample point associated with the network route is assigned to generate a plurality of labeled network routes.

The process 800 proceeds to step 808 where network device 102 may generate, using a supervised machine learning mechanism, a route stability classifier based at least in part on the labels for the plurality of network routes. In some examples, generating, using the supervised machine learning mechanism, the route stability classifier based at least in part on the route stability labels for the plurality of network routes includes deriving a labeled set of training data for the supervised machine learning mechanism based on the plurality of labeled network routes, and generating a decision tree classifier 700 as the route stability classifier by inputting the labeled set of training data into the supervised machine learning mechanism.

The process 800 proceeds to step 810 where network device 102 may determine, using the route stability classifier, a route stability of a new network route within the network 150. In some examples, determining, using the route stability classifier, the route stability of the new network route within the network 150 includes determining that the route stability of the new network route within the network 150 is one of: reliable, intermittent, or fickle. In some examples, determining, using the route stability classifier, the route stability of the new network route within the network 150 includes determining changes in route stability of a plurality of new network routes within the network 150 over time using the route stability classifier. In some examples, determining the changes in route stability of the plurality of new network routes within the network 150 includes determining a possible failure in the network 150 based at least in part on the changes in route stability of the plurality of new network routes within the network.

Hardware Overview

Figure 9:
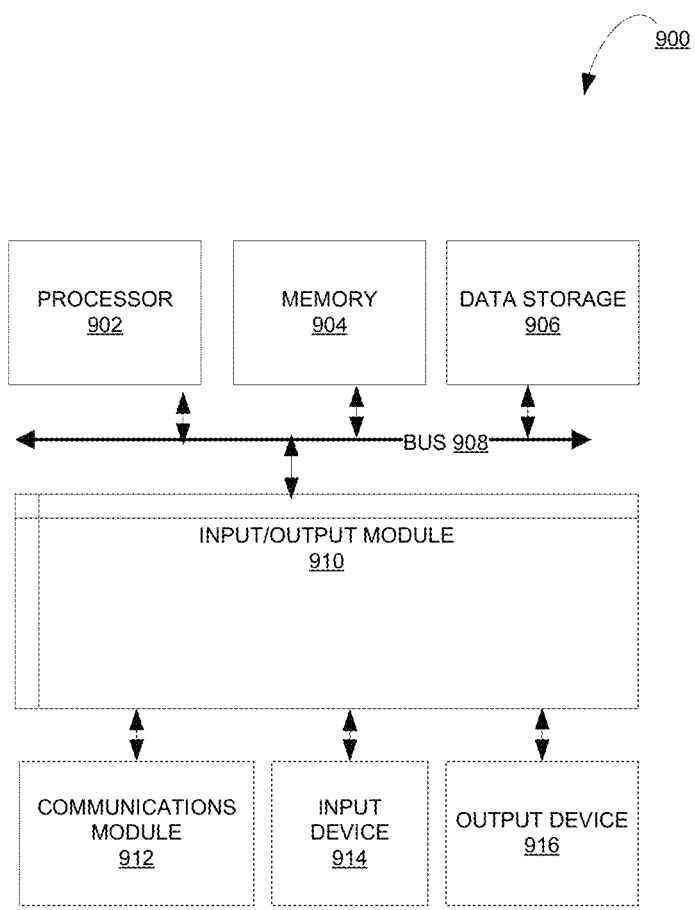
FIG. 9 is a block diagram illustrating an example computer system with which the example network device of FIGS. 1 and 2 can be implemented.

FIG. 9 is a block diagram illustrating an example computer system 900 with which network device 102 of FIGS. 1 and 2 can be implemented. In certain aspects, the computer system 900 may be implemented using hardware or a combination of software and hardware, either in a dedicated server, or integrated into another entity, or distributed across multiple entities.

Computer system 900 (e.g., network device 102) includes a bus 908 or other communication mechanism for communicating information, and a processor 902 (e.g., processor 212) coupled with bus 908 for processing information. According to one aspect, the computer system 900 can be a cloud computing server of an IaaS that is able to support PaaS and SaaS services. According to one aspect, the computer system 900 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 900 may be implemented with one or more processors 902. Processor 902 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memory 220) such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry. Expansion memory may also be provided and connected to computer system 900 through input/output module 910, which may include, for example, a SIMM (Single In Line Memory Module) card interface. Such expansion memory may provide extra storage space for computer system 900, or may also store applications or other information for computer system 900. Specifically, expansion memory may include instructions to carry out or supplement the processes described above, and may include secure information also. Thus, for example, expansion memory may be provided as a security module for computer system 900, and may be programmed with instructions that permit secure use of computer system 900. In addition, secure applications may be provided via the SIMM cards, along with additional information, such as placing identifying information on the SIMM card in a non-hackable manner.

The instructions may be stored in the memory 904 and implemented in one or more computer program products, e.g., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, embeddable languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Example input/output modules 910 include data ports such as USB ports. In addition, input/output module 910 may be provided in communication with processor 902, so as to enable near area communication of computer system 900 with other devices. The input/output module 910 may provide, for example, for wired communication in some implementations, or for wireless communication in other implementations, and multiple interfaces may also be used. The input/output module 910 is configured to connect to a communications module 912.

Example communications modules 912 (e.g., communications modules 218) include networking interface cards, such as Ethernet cards and modems.

The components of the system can be interconnected by any form or medium of digital data communication, e.g., a communication network. The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 912 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 912 sends and receives electrical, electromagnetic or optical signals that carry digital data streams representing various types of information. The network link typically provides data communication through one or more networks to other data devices. For example, the network link of the communications module 912 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 912, which carry the digital data to and from computer system 900, are example forms of transmission media.

Computer system 900 can send messages and receive data, including program code, through the network(s), the network link and communications module 912. In the Internet example, a server might transmit a requested code for an application program through Internet, the ISP, the local network and communications module 912. The received code may be executed by processor 902 as it is received, and/or stored in data storage 906 for later execution.

In certain aspects, the input/output module 910 is configured to connect to a plurality of devices, such as an input device 914 and/or an output device 916. Example input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 916 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 916 may comprise appropriate circuitry for driving the output device 916 to present graphical and other information to a user.

According to one aspect of the present disclosure, network device 102 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. Processor 902 may process the executable instructions and/or data structures by remotely accessing the computer program product, for example by downloading the executable instructions and/or data structures from a remote server through communications module 912 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 902 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 908. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for determining network route stability, comprising:
   determining a plurality of sample points associated with a plurality of network routes within a network during a time interval, comprising tracking changes within a routing table in the network to determine the amount of uptime for the respective route during the time interval and the total frequency of state changes for the respective route during the time interval,
   wherein each sample point from the plurality of sample points is associated with a respective network route from the plurality of network routes, and
   wherein each sample point comprises an amount of uptime for the respective network route during the time interval and a total frequency of state changes for the respective network route during the time interval;
   generating, using an unsupervised machine learning mechanism, a plurality of clusters of the plurality of sample points;
   labeling the plurality of network routes with route stability labels based at least in part on the plurality of clusters;
   generating, using a supervised machine learning mechanism, a route stability classifier based at least in part on the route stability labels for the plurality of network routes; and
   determining, using the route stability classifier, a route stability of a new network route within the network.

2. The computer-implemented method of claim 1, wherein tracking the changes within the routing table in the network further comprises:
   determining the amount of uptime for the respective network route during the time interval based on an amount of time during the time interval that the routing table includes an indication of the respective network route; and
   determining the total frequency of state changes for the respective network route during the time interval based on a number of times the routing table switches between including the indication of the network route and not including the indication of the network route.

3. The computer-implemented method of claim 1, wherein generating, using the unsupervised machine learning mechanism, the plurality of clusters of the plurality of sample points further comprises:
   deriving a set of training data for the unsupervised machine learning mechanism based on at least a portion of the plurality of sample points; and
   generating the plurality of clusters of the plurality of sample points by inputting the set of training data into the unsupervised machine learning mechanism.

4. The computer-implemented method of claim 3,
   wherein the unsupervised machine learning mechanism comprises a k-means clustering unsupervised machine learning mechanism; and
   wherein generating the plurality of clusters of the plurality of sample points comprises performing, using the k-means clustering unsupervised machine learning mechanism, k-means clustering of the plurality of sample points to generate the plurality of clusters of the plurality of sample points.

5. The computer-implemented method of claim 1, wherein labeling the plurality of network routes with route stability labels based at least in part on the plurality of clusters further comprises:
   labeling each network route from the plurality of network routes with a route stability label associated with a cluster from the plurality of clusters to which a sample point associated with the network route is assigned to generate a plurality of labeled network routes.

6. The computer-implemented method of claim 5, wherein generating, using the supervised machine learning mechanism, the route stability classifier based at least in part on the route stability labels for the plurality of network routes further comprises:
   deriving a labeled set of training data for the supervised machine learning mechanism based on the plurality of labeled network routes; and
   generating a decision tree classifier as the route stability classifier by inputting the labeled set of training data into the supervised machine learning mechanism.

7. The computer-implemented method of claim 1, wherein determining, using the route stability classifier, the route stability of the new network route within the network comprises:
determining that the route stability of the new network route within the network is one of: reliable, intermittent, or fickle.

8. The computer-implemented method of claim 1, wherein determining, using the route stability classifier, the route stability of the new network route within the network comprises:
determining changes in route stability of a plurality of new network routes within the network over time using the route stability classifier.

9. The computer-implemented method of claim 8, wherein determining the changes in route stability of the plurality of new network routes within the network further comprises:
determining a possible failure in the network based at least in part on the changes in route stability of the plurality of new network routes within the network.

10. A system for determining network route stability:
a memory comprising a routing table; and
a processor configured to execute instructions which, when executed, cause the processor to:
determine a plurality of sample points associated with a plurality of network routes within a network during a time interval, comprising tracking changes within the routing table to determine the amount of uptime for the respective route during the time interval and the total frequency of state changes for the respective route during the time interval,
wherein each sample point from the plurality of sample points is associated with a respective network route from the plurality of network routes, and
wherein each sample point comprises an amount of uptime for the respective network route during the time interval and a total frequency of state changes for the respective network route during the time interval;
generate, using an unsupervised machine learning mechanism, a plurality of clusters of the plurality of sample points;
label the plurality of network routes with route stability labels based at least in part on the plurality of clusters;
generate, using a supervised machine learning mechanism, a route stability classifier based at least in part on the route stability labels for the plurality of network routes; and
determine, using the route stability classifier, a route stability of a new network route within the network.

11. The system of claim 10, wherein the processor configured to execute the instructions which, when executed, cause the processor to track the changes within the routing table is further configured to execute the instructions which, when executed, cause the processor to:
determine the amount of uptime for the respective network route during the time interval based on an amount of time during the time interval that the routing table includes an indication of the respective network route; and
determine the total frequency of state changes for the respective network route during the time interval based on a number of times the routing table switches between including the indication of the network route and not including the indication of the network route.

12. The system of claim 10, wherein the processor configured to execute the instructions which, when executed, cause the processor to generate, using the unsupervised machine learning mechanism, the plurality of clusters of the plurality of sample points is further configured to execute the instructions which, when executed, cause the processor to:
derive a set of training data for the unsupervised machine learning mechanism based on at least the portion of the plurality of sample points; and
generate the plurality of clusters of the plurality of sample points by inputting the set of training data into the unsupervised machine learning mechanism.

13. The system of claim 12,
wherein the unsupervised machine training mechanism comprises a k-means clustering unsupervised machine learning mechanism; and
wherein the processor configured to execute the instructions which, when executed, cause the processor to generate the plurality of clusters of the plurality of sample points is further configured to execute the instructions which, when executed, cause the processor to perform, using the k-means clustering unsupervised machine learning mechanism, k-means clustering of the plurality of sample points to generate the plurality of clusters of the plurality of sample points.

14. The system of claim 10, wherein the processor configured to execute the instructions which, when executed, cause the processor to label the plurality of network routes with the route stability labels based at least in part on the plurality of clusters is further configured to cause the processor to label each network route from the plurality of network routes with a route stability label associated with a cluster from the plurality of clusters to which a sample point associated with the network route is assigned to generate a plurality of labeled network routes.

15. The system of claim 14, wherein the processor configured to execute the instructions which, when executed, cause the processor to generate, using the supervised machine learning mechanism, the route stability classifier based at least in part on the route stability labels for the plurality of network routes is further configured to execute the instructions which, when executed, cause the processor to:
derive a labeled set of training data for the supervised machine learning mechanism based on the plurality of labeled network routes; and
generate a decision tree classifier as the route stability classifier by inputting the labeled set of training data into the supervised machine learning mechanism.

16. The system of claim 10, wherein the processor configured to execute the instructions which, when executed, cause the processor to determine, using the route stability classifier, the route stability of the new network route within the network is further configured to execute the instructions which, when executed, cause the processor to determine that the route stability of the new network route within the network is one of: reliable, intermittent, or fickle.

17. The system of claim 10, wherein the processor configured to execute the instructions which, when executed, cause the processor to determine, using the route stability classifier, the route stability of the new network route within the network is further configured to execute the instructions which, when executed, cause the processor to determining changes in route stability of a plurality of new network routes within the network over time using the route stability classifier.

18. A non-transitory machine-readable storage medium comprising machine-readable instructions for causing a processor to execute a method for determining network route stability, comprising:
- determining a plurality of sample points associated with a plurality of network routes within a network during a time interval, comprising tracking changes within the routing table to determine the amount of uptime for the respective route during the time interval and the total frequency of state changes for the respective route during the time interval,
- wherein each sample point from the plurality of sample points is associated with a respective network route from the plurality of network routes, and
- wherein each sample point comprises an amount of uptime for the respective network route during the time interval and a total frequency of state changes for the respective network route during the time interval;
- generating, using an unsupervised machine learning mechanism, a plurality of clusters of the plurality of sample points;
- labeling the plurality of network routes with route stability labels based at least in part on the plurality of clusters;
- generating, using a supervised machine learning mechanism, a route stability classifier based at least in part on the route stability labels for the plurality of network routes; and
- determining, using the route stability classifier, a route stability of a new network route within the network.

* * * * *